United States Patent Office 3,266,992
Patented August 16, 1966

3,266,992
TABLETS AND METHOD OF PREPARING
THE SAME
Elkan Joachim de Jong, Rotterdam, Netherlands, assignor to N.V. Organon, Oss, Netherlands, a limited-liability corporation of the Netherlands
No Drawing. Filed Jan. 22, 1963, Ser. No. 253,066
Claims priority, application Netherlands, Jan. 25, 1962, 273,962
13 Claims. (Cl. 167—82)

This invention relates to a method of preparing tablets which spontaneously disperse in an aqueous liquid when immersed therein, and to tablets prepared according to the method. The method will be described hereinafter in its application to the preparation of medicinal tablets, but will be understood not to be limited thereto.

When tablets are prepared by compression of a comminuted material according to conventional methods, at least a major portion of the material must be of granular consistency. Uniform filling of the die cavity usually cannot be obtained unless at least a major fraction of the raw material has a grain size in the approximate range of 0.3 to 1.5 millimeters. The presence of such a grain size fraction and sufficient binding capacity in the materials received by the tablet maker from the chemical manufacturer or other supplier are the exception rather than the rule. The particle size is normally smaller than desired and it is usual to granulate the powdery material prior to tableting, by which treatment also binding capacity is obtained.

There are two well-known granulating methods. According to the wet method granules are obtained from powder by moistening with water, solvents, or binder solutions, and kneading the resulting mixture so that the powder particles are agglomerated into lumps. The lumps are forced through a screen, and must be dried prior to tableting. In the other customary method, also called "slugging," the original dry fine powder is precompressed to oversized tablets or slugs, and these slugs are ground and screened to the desired particle size. The fines resulting from either method must for the greater part be removed prior to tableting, and may be returned to another batch of raw material.

When the tablet to be produced consists mainly of inert excipients or fillers and only of a minor fraction of active material, the excipient which may consist of milk sugar or calcium phosphate is usually granulated by moistening and screening, and is mixed with the active agent in powder form. The mixture gradually tends to separate into its constituent parts while being held in the hopper of the tableting machine so that the tablets produced in a run are of unequal strength. Especially when the active agent is only a minor fraction of the final product, it is therefore necessary to regrind the tablets to granule size, and to mix and recompress the ground material. Then the homogenity will be sufficient.

Granulating prior to tableting is not only costly, but it inherently interferes with the spontaneous dispersion of the tablets after ingestion. The granules adhered to each other by the tableting pressure may fall apart readily upon contact with an aqueous liquid, but the particles within each granule are bonded to each other more firmly, and the effective surface area of the ingested material remains relatively small over a relatively long period. It is normally desirable that a tablet disintegrates as rapidly and completely as possible to promote rapid absorption of the active agent by the mucous membranes of the intestinal tract. A decomposition of ingested tablets in stages which include a relatively stable granule stage is therefore disadvantageous.

The disintegration of a tablet must not be confused with the dispersion. Up to now nearly all attention was focused on the problem of disintegration. There are many measures recommended and patented to promote this. The demands that are made by most pharmacopoeias relate only to the time in which the tablet has fallen apart. The pharmacopoeias of the United States, France and Great Britain moreover limit the particle size after disintegration. The British is most demanding among the three mentioned. Yet, it is satisfied with a disintegration to particles, capable of passing a screen having a mesh size of approximately 1.7 millimeters. These requirements are extremely modest. It will be understood that particles of such a size cannot give a homogeneous dispersion. However, for a rapid absorption the ultimate particle size is of much more importance than the disintegration time.

Therefore, the moderateness of the pharmacopoeias can be explained only when it is assumed that so far it apparently has been impossible to make tablets which after disintegration in water form a reasonable homogeneous dispersion.

The fact that many pharmacologically active substances are hydrophobic, makes the preparation of readily dispersible tablets particularly difficult. The use of strongly hydrophilic binders during granulation can only partly compensate the unfavorable effects of an active agent present in major amounts. The use of surfactants as tablet ingredients is limited by the fact that many materials of this type have an unpleasant taste and/or are toxic. Surfactants also increase the tendency of the tableting composition to stick on the die. Moreover, surfactants sometimes have been found to be rather hampering the disintegration of tablets.

The primary object of the invention is a free flowing powdery tableting composition of very small particle size capable of being compressed into tablets without being granulated before.

Another important object is the provision of tablets adapted rapidly to disintegrate into the original fine particles when contacted with water, even if the tablets contain a major fraction of a hydrophobic active agent.

With these and other objects in view, the invention in one of its aspects mainly consists in a method of preparing a tablet or a like shaped body from a plurality of constituent substances including at least one powdery material preferably having a particle size smaller than about 60 mesh and a binder. The characteristic steps of the method comprise mixing the binder with the powdery material, in the presence of a liquid, while avoiding kneading action and the resulting increase in particle size. The amount of the liquid should be sufficient to distribute the binder over the surfaces of the powder particles, but insufficient to cause substantial coherence of the mass. The binder must be at least partly soluble in the liquid. It must be present in an amount sufficient to bond the particles when subjected to compression. The particles are superficially coated with the binder in the mixing process. They are then dried, transferred to a conventional tableting machine and compressed.

The manner in which a powder according to the invention is obtained differs from the classical granulation mainly in the amount of liquid to be used. When granulating, the latter has to be so great that during kneading the mass coheres; the most desired consistency sometimes is described as that of snow at a temperature just below freezing point.

In the process according to the invention, only so little liquid as exactly is necessary for a homogeneous wetting of the mass is used. This quantity amounts to a fraction of that necessary for granulating. Too large an amount of moisture not only is uneconomical, but the effect aimed at is also unfavorably influenced. When using such an amount of liquid that agglomeration occurs and consequently granulation is possible, the effect may even disappear entirely.

I.e. the correct amount of moisture depends on the nature of the substance, on the particle size distribution and on the mixing apparatus used. In general it will amount to ⅛ to ½ of the amount to be used for granulation.

When the substance to be treated is soluble in the liquid used, one has to be particularly careful when adding moisture. Sometimes in such an instance 2–3% is sufficient as opposed to 5–10% for many insoluble substances. For products taking up water, such as potato starch, much more is necessary, about 30%. All these percentages are calculated on the substances to be treated.

The function of the binder and its distribution in the tablet composition differ basically from the function and distribution of the binder in granulates prepared by conventional methods. The binder admixed prior to granulating in amounts sufficient to permit formation of the granules is inherently distributed throughout each granule. The major portion of it is enclosed within the granule and effective there to hold the original finer particles together. In the tableting mixture of the invention, the binder is mainly distributed over the surface of the individual particles. The binder layer is activated only by the pressure exerted on the material during compressing.

Therefore, it is impossible to obtain powder with the desired properties by dry grinding a classical granulate. The binding capacity of the binders is so great that the binding substantially cannot be disrupted by mechanical methods. Moreover the substance is present in a large excess in respect of the binder. The result is that during grinding of a granulate break will occur in the substance and not in the structure of the binder. Consequently, the particles will consist of binder, enveloped by the substance. Consequently, the reverse of the situation with the powders obtained according to the invention.

When the available raw material is too coarsely crystalline and smaller particles are desired, it has to be ground before the treatment according to the invention. In this respect it can be remarked that although the invention is not restricted to a certain particle size, the best results are obtained when the particles are not larger than 100 to 200 microns. In respect of the apparatus, a homogeneous distribution of the binder over the surface of the substance particles can be obtained only by careful very intensive mixing, in which, in contradistinction with the wet granulating method, no kneading should take place at all to avoid an increase in particle size by agglomeration.

With relatively coarsely crystalline products which are often applied in pharmacy, this is not a great problem. The more the substance is finely divided, however, the more difficult homogeneous mixing can be carried out with little liquid as required in the process according to the invention. The use of more liquid would facilitate homogenous mixing, but under such circumstances a more or less classical granulate will be obtained, which has to be avoided according to the invention.

For the mixing in the process according to the invention nearly all usual mixing apparatus can be applied. Planetary mixers of the type Hobart, which are generally known, are preferred. For finely divided materials the mixing can be facilitated by replacing the beater, by a stirrer of approximately the same model, constructed however, of bands of stainless steel being sharpened at one side, and having a width of a few centimeters. The sharp edge of this stirrer planetarily cuts with an adjustable speed through the entire mass, which mass is homogeneously wetted without the forming of lumps and substantially without increase of temperature.

To very fine substances also a water absorbing auxiliary agent, e.g. alginic acid, can be added. In that event a little more moisture than the minimum amount is used and thereupon 1–5% of alginic acid is added, which takes up the excess of moisture like a sponge. After careful mixing the product then suddenly seems much drier. Under these circumstances it can be dried nearly without particle binding.

The binders customarily employed in tableting including polyvinyl pyrrolidone, gelatin, solid polyethylene glycols such as those known under the trademark "Carbowax," and various polysaccharides may be employed in the method of the invention. They are dissolved in suitable solvents, preferably in water, or in organic solvents such as alcohols, acetone, methylene chloride, mixtures thereof, and the like. The best results, however, are obtained with binders selected according to the following considerations.

The materials to be tableted may be broadly classified in four groups as follows:

(A) Hydrophobic substances: This group includes, for example, acetophenetidine, sulfur, chloramphenicol, and iodochlorohydroxyquinoline.

(B) Hydrophilic substances sparingly soluble or insoluble in water: Sulfadiazine, procaine, penicillin, basic bismuth nitrate are examples of this group.

(C) Hydrophilic substances soluble in water and stable in aqueous solution: Many inorganic and organic salts and sucrose are representative of this group.

(D) Hydrophilic substances soluble in water, but unstable in the presence of water, for example, ascorbic acid, isoproterenol sulfate; and hygroscopic substances, such as promazine hydrochloride.

The preferred binders for the hydrophobic materials of Group A are non-ionic water soluble cellulose derivatives, and more specifically methylcellulose of the low viscosity type. The methylcellulose available under the trademark Tylose and under the grade designation MH–50 is generally suitable for bonding members of Group A. When mixed according to the invention with methylcellulose, any powder of a hydrophobic substance such as those enumerated above can be dispersed in water in the absence of any other dispersing agent or surfactant. This is a completely surprising effect. Such dispersibility is not affected when the mixture powder is further diluted with 10 to 20 percent starch, and the mixture is tableted.

Group B permits the choice of a wider variety of binders. Although methylcellulose is preferred, good results are also obtained with such ionogenic cellulose derivatives as sodium carboxymethylcellulose (CMC).

The substances of Group C are at higher concentrations generally incompatible with methylcellulose. When relatively concentrated aqueous solutions of members of this group and of methylcellulose are mixed, precipitates form. Carboxymethylcellulose and hydroxyethylcellulose are represenitatives of the cellulose derivatives which are mostly compatible with materials of Group C in practical concentrations. The grade of hydroxyethylcellulose sold as "Natrosol 250" (Hercules Powder Company) is well suited.

Non-ionogenic cellulose derivatives soluble in organic liquids are preferably employed as binders with substances of Group D. Ethylhydroxyethylcellulose (for example EHEC low viscosity, Hercules Powder Company) and ethylcellulose (for example, type N–22 of Hercules Powder Company having a nominal ethoxyl content of 47.5 to 49.0%, and a viscosity of 22 cps. at 25° C. in an 80:20 mixture of toluene and ethanol) are soluble in acetone, and may be admixed to the tableting material in the form of their acetone solutions.

Alternatively most substances of Groups C and D can be treated with methylcellulose or hydroxyethylcellulose dissolved in a mixture of e.g. 2 parts of methylene chloride and 1 part of methanol.

The several binders mentioned above may be employed jointly as far as they are compatible with the other tablet materials and the sequence of mixing the several components of the tableting composition may be altered in a manner well understood by those skilled in the art as far as consistent with the teachings of the instant disclosure.

The quantity of binder employed is not overly critical. It will generally be within the limits of 0.1 and 5 percent of the solid remainder of the tableting composition. Amounts of binder between 0.3 and 0.5 percent are satisfactory under almost all conditions, and will give best results under most. An excess of binder delays disintegration of the tablets. This may be an advantage, e.g. in lozengers. The binder is dissolved in a suitable solvent, and the resultant solution is mixed with at least one of the other solid constituents of the tableting composition. The concentration of the binder in the solvent may vary greatly, 4 and 34 percent being approximate upper and lower limits of binder concentration in the solution. When the tableting composition includes a hydrophobic substance, I prefer to employ a 5 percent solution of methylcellulose in water and to admix 10 percent of this solution to the hydrophobic material (calculated on the weight of this material). The preliminary mixture so obtained may then be combined with the remainder of the tableting composition. Such a procedure is generally more convenient than mixing the dry binder with substance, and adding water or the solvent last. In the latter case, some time elapses before the cellulose derivative swells sufficiently to be effective.

The invention relates also to a special embodiment, in which the binding agent is not added only with the necessary quantity of liquid, in which it dissolves or swells, but moreover with a quantity of another liquid, in which it does *not* dissolve or swell, which liquid can easily be removed after mixing e.g. by evaporation.

In this way e.g. methylcellulose can be applied on the particles to be coated by means of water and acetone (methylcellulose does not dissolve and does not swell in acetone), after which the acetone is evaporated. This embodiment leads in a shorter time to a homogeneous coating of the particles to be coated than when using a liquid in which the binding agent swells or dissolves, alone.

Whether or not the amount of moisture added to a tableting composition is adequate, whether the mixing apparatus employed is operating properly, and whether the mixing operation has progressed sufficiently can be determined by a simple test. A sample of the mixture is contacted with a solution of a dye and the binder in the liquid, for example, a 0.004 percent methylene blue solution in aqueous methylcellulose. Any lack of homogenity of the sample becomes immediately apparent by the streaky or patchy appearance of the dyed sample, and indicates improper operation of the mixer or too short a mixing period. Deep blue dots indicate insufficient moisture.

The ability of the tableting compositions of the invention to absorb dyes may, of course, be utilized for the purpose of making colored tablets in a manner too obvious to require more detailed description.

The mixture containing the binder and other solids of the tableting composition together with the liquid employed to disperse the binder is then dried. The conventional procedures normally employed in drying granules prior to tableting may be employed. When the composition contains materials having a normal water content when in equilibrium with the ambient atmosphere such as starch or crystals having crystal water, air drying at room temperature is preferred, and is entirely practical because of the small amount of water to be removed from the mixtures of the invention. Drying overnight in thin layers usually is adequate.

This invention offers particular advantages in the preparation of tablets in which the active agent is but a minor fraction of the total weight, and the major portion of the tablet consists of an inert excipient or filler. Lactose (milk sugar) is most commonly employed. It has its disadvantages though. While its solubility in water is relatively small, it is still great enough so that tablets containing milk sugar do not rapidly disintegrate. As mentioned before, tablets prepared in a conventional manner from granules containing a small amount of active agent and a very large amount of excipient have to be tableted twice with an intermediate crushing operation if uniformly dosed tablets are to be obtained.

The method of the invention makes it entirely practical to employ fine-grained potato starch as a filler or excipient for tablets without unfavorably affecting the disintegration properties of the tablets. The starch may be premixed with 2 to 20 percent, typically 5 percent, magnesium trisilicate powder, a commercial product of the approximate formula $Mg_2Si_3O_8 \cdot 5H_2O$. The magnesium trisilicate has been found to improve the bonding of particles in tablets prepared with the starch excipient.

To each kilogram of the starch-silicate premix, 5 grams of methylcellulose dissolved in 300 cubic centimeters of water are added on a Hobart type planetary mixer. The product is dried to a water content of 15 percent as determined by infrared irradiation of a sample to constant weight. 5 percent talcum powder and 0.3 percent magnesium stearate were added last to the mixture which was then ready to be compressed into tablets which rapidly disintegrate and disperse in water. Since the tableting composition is a very fine powdery mixture of moderate specific gravity, even very small amounts of active agents which are mostly organic compounds of equally low specific gravity may be distributed therein easily and uniformly in a way known by those skilled in the art, just prior to tableting.

When the absolute absence of water is a requirement, such as e.g. when tableting ascorbic acid, powdered sugar can excellently be used as a carrier. The sucrose is treated with hydroxyethyl cellulose and 3% of water. After complete drying it is mixed with ascorbic acid and a little of magnesium stearate. The mixture can immediately be compressed to tablets which are water-soluble. It is also possible to treat a mixture of ascorbic acid and sugar with a solution of ethylcellulose or ethylhydroxyethylcellulose in acetone, or with a solution of hydroxyethylcellulose in a methylene chloride-methanol mixture (2:1). These processes are preferred for tablets consisting of ascorbic acid for more than 25%.

Lactose, treated with methylcellulose, is an excellent filler for vaginal tablets. Cores for coated pills may be prepared from the tableting compositions of this invention in the conventional manner, and may then be coated with a sweetened shell in the customary manner. The term "tablet" as employed hereinafter will therefore be understood to include the cores of sugar-coated pills and the like.

The invention is further illustrated by the following examples, but it will be understood that it is not limited thereto. In these examples, with the exception of Example X, the solid materials employed as active agents, excipient and lubricant (if any) in making 10,000 tablets are listed first, and followed by a description of the manipulative steps used in combining them with each other and with a binder to make a tableting composition which is then compressed in a tableting machine in the usual manner not requiring more detailed description.

*Example I*

|   | Grams |
|---|---|
| Acetophenetidine | 2,500 |
| Potato starch | 250 |

The acetophenetidine is mixed in a Hobart mixer with 250 grams of a 5 percent solution of low viscosity methylcellulose in water. The mixer was similar to that illustrated and described by J. E. Carless, Manufacturing Chemist 32, 206 (1961). The coated acetophenetidine powder is dried at 30 to 40° C. The tableting composition is completed by admixing the potato starch.

Example II

| | Grams |
|---|---|
| Sulfadiazine | 5,000 |
| Alginic acid | 250 |
| Potato starch | 750 |
| Magnesium stearate | 18 |

The sulfadiazine is mixed in a Hobart mixer provided with a modified beater with one kilogram of the 5 percent methylcellulose solution described in Example 1. After the mixture is homogeneous, 250 cubic centimeters of water and the alginic acid are added and mixed in. The resulting premix is dried at 30 to 40° C. and combined with the potato starch and magnesium stearate.

Sulfamerazine, sulfamethazine, and like materials may be substituted for the sulfadiazine listed above, and carboxymethylcellulose may be substituted for methyl cellulose to produce compositions which are readily tableted, and tablets which rapidly disintegrate in aqueous liquids to release their active agents.

Example III

| | Grams |
|---|---|
| Iodochlorohydroxyquinoline | 2,500 |
| Calcium phosphate ($CaHPO_4 \cdot 2H_2O$) | 750 |
| Alginic acid | 250 |
| Potato starch | 1,220 |
| Magnesium stearate | 14 |

The iodochlorohydroxyquinoline and calcium phosphate are combined with a solution of 16 grams methylcellulose in 750 ml. water. The alginic acid is mixed in next. The resulting powder mixture is dried at 30 to 40° C., and further mixed with the potato starch and magnesium stearate.

Example IV

| | Grams |
|---|---|
| Antipyrine | 2,500 |
| Acetophenetidine | 2,500 |
| Caffeine | 500 |
| Potato starch | 750 |

The antipyrine is mixed with 125 grams of a 10 percent solution of hydroxyethylcellulose (Natrosol 250) in water. The mixture is dried at 30 to 40° C. The acetophenetidine and caffeine are jointly mixed with 300 grams of an aqueous 4 percent solution of low viscosity methylcellulose (Tylose MH–50), and the mixture is dried as above. The two mixtures and the potato starch are combined and the resulting powdery composition is tableted.

Example V

| | Grams |
|---|---|
| Bismuth subnitrate | 5,000 |
| Potato starch | 1,000 |
| Magnesium stearate | 18 |

The basic bismuth nitrate is mixed with 400 grams of an aqueous 6 percent methylcellulose solution. The mixture is dried as described in the preceding examples, and mixed with the starch and magnesium stearate.

Example VI

| | Grams |
|---|---|
| Chloramphenicol | 2,500 |
| Alginic acid | 100 |
| Potato starch | 140 |
| Magnesium stearate | 10 |

The chloramphenicol is mixed with 250 grams of an aqueous 5 percent methylcellulose solution. The alginic acid is added next, and the mixture is dried by contact with the ambient atmosphere to a moisture content between one and two percent as determined by infrared drying of a sample. The starch and magnesium stearate are mixed with the dried product. Cores are pressed from the mixture and coated with a sugar composition in the usual manner.

Example VII

| | Grams |
|---|---|
| Sodium p-aminosalicylate | 5,000 |
| Sodium metabisulfite | 20 |
| Potato starch | 962 |
| Magnesium stearate | 18 |

The sodium aminosalicylate and sodium metabisulfite are mixed with 500 grams of a 5 percent solution of ethylcellulose (Hercules Powder Co., type N–22) in acetone. Additional acetone (less than one liter) may be admixed to make up for evaporation losses. The mixture is dried and combined with the starch and magnesium stearate

Example VIII

| | Grams |
|---|---|
| Ascorbic acid | 500 |
| Powdered sugar (sucrose) | 1,500 |
| Magnesium stearate | 12 |
| Hydroxyethylcellulose (Natrosol 250) | 60 |

The sugar is pre-mixed with 37.5 grams dry hydroxyethylcellulose, and the remainder of the hydroxyethylcellulose is then added in the form of an aqueous 33 percent solution. The product is dried to constant weight at 60° C. It is then combined with the ascorbic acid and the magnesium stearate to a tableting composition from which tablets of pleasant taste are prepared in the usual manner. Carboxymethylcellulose may replace the hydroxyethylcellulose.

A similar composition may be prepared by dry blending of the sugar with the finely comminuted ascorbic acid, and by subsequent addition of 200 milliliters of a 5 percent solution of ethylcellulose in acetone. Like in the preceding examples, all kneading must be avoided. The magnesium stearate is added last after evaporation of the acetone. Ethylhydroxyethylcellulose is effective in the same manner as the ethylcellulose.

Example IX

| | Grams |
|---|---|
| Isoproterenol sulfate | 200 |
| Tartaric acid | 100 |
| Powdered sugar | 6,100 |
| Magnesium stearate | 100 |

The sugar is first treated with 244 grams hydroxyethylcellulose in two stages as described in Example VIII. The dry product is then combined with the other constituents, and the resulting composition is tableted.

Example X

| | |
|---|---|
| Potato starch, kilograms | 9.5 |
| Magnesium trisilicate, kilograms | 0.5 |
| Aqueous 5% methylcellulose solution, kilogram | 1 |
| Water, liters | 2 |
| Methyl p-hydroxybenzoate, grams | 3.6 |
| and | |
| Propyl p-hydroxybenzoate, gram | 0.4 |

The several ingredients are mixed, and the starch-silicate excipient so prepared is dried. Drying is continued until the moisture content as determined by drying to constant weight under infrared radiation is 15 percent. This product will be referred to hereinafter for the sake of brevity as "starch-silicate excipient 15%."

Example XI

| | Grams |
|---|---|
| Digoxin | 2.5 |
| Talcum powder | 70 |
| Magnesium stearate | 4.2 |
| Starch-silicate excipient 15% | 1,325 |

The digoxin is dissolved in 100 milliliters 70 percent alcohol and mixed with the excipient in the usual way.

The other constituents are then added, and the tableting composition so obtained is compressed to tablets.

The same procedure may be followed to prepare tablets containing ten milligrams or less of such active agents as atropine sulfate, ethynyl estradiol, or reserpine. Of course, one should take care to select the correct solvent.

*Example XII*

5,000 g. of acetyl salicylic acid with a particle size below 10 micron are thoroughly mixed with 1500 g. of a 6.33% solution of methylcellulose (Tylose MH-50) in equal parts of methylene chloride and methanol.

To this mass is added after evaporation of the solvent 1500 g. of a mixture of potato-starch with 5% magnesium-trisilicate, pre-coated with 0.5% methylcellulose and 0.3% magnesium stearate, dried until a moisture content of 7%.

This mass can be tableted at once.

*Example XIII*

5000 g. of theobromine-calcium salicylate are mixed with a solution of 25 g. methylcellulose in a mixture of 600 ml. of methylene chloride, 300 ml. of methanol and 100 ml. of water. The mass is dried and mixed with 250 g. talc, 15 g. magnesium stearate and 500 g. potato starch and the mixture is compressed to tablets.

*Example XIV*

5000 g. of sulfadiazine are mixed with 500 g. of a 3% suspension of magnesium stearate in 5% aqueous methylcellulose (Tylose MH-50) solution. Further 0.9 grams of methyl p-hydroxybenzoate and 0.1 grams propyl p-hydroxybenzoate dissolved in 500 milliliter water are added and subsequently 1400 grams of acetone. To this mass is added 970 grams starch silicate excipient 15%. The mixture is dried at 40-50% C. The weight is subsequently adjusted with starch silicate excipient 15% to 6000 grams. This mixture can be tableted at once.

The advantages over the classical tableting methods are evident. In the first place the spectacular improvement of the disintegration, with which dispersions are obtained which really may have said name.

In the second place the simplicity of the method. Both the wet and the dry granulating methods require many more treatments, i.a. screening. With the wet granulating method generally much more moisture is to be evaporated and this costs calories and/or time.

While specific optimal tableting pressures vary greatly with such process variables as size and shape of the tablets, surface of the dies, and the like, the pressures required for tableting the compositions of the invention to a predetermined hardness is significantly lower than that needed for tableting otherwise comparable conventionally prepared compositions. The lower processing pressure inherently increases the useful life span of the dies and punches and of the tableting machine in general.

The method of the invention permits the easy tableting of many materials which previously could not be tableted in a practical manner such as powdered cane or beet sugar (sucrose), potato starch, or sodium phenobarbital.

While the invention has been described with particular reference to specific embodiments it is to be understood that it is not limited thereto, but is to be construed broadly and restricted solely by the scope of the appended claims.

What is claimed is:

1. A method of making a tablet from a plurality of constituent substances including at least one powdered material having a particle size smaller than 60 mesh and a binder, which comprises:
   (a) intimately mixing said binder with said material while substantially maintaining the particle size of said one material,
      (1) the amount of said binder being between 0.1 and 5 percent of the amount of said one material,
      (2) said binder and said material being mixed in the presence of an amount of a liquid sufficient to distribute the binder uniformly over the surface of the particles of said one material, but insufficient to form a continuous liquid phase, the binder being at least partly soluble in said liquid, whereby said particles are coated with said binder,
      (3) the amount of said liquid being between two and fifty percent of said one material,
      (4) the amount of said binder being sufficient to bond said particles when subjected to compression; and
   (b) compressing the coated particles until said particles are bonded to each other.

2. A method as set forth in claim 1, wherein said material is hydrophobic, said binder is a non-ionogenic, water soluble cellulose derivative, and said liquid is water.

3. A method as set forth in claim 1, wherein said material is hydrophilic but not soluble in water in a substantial amount, said binder is a cellulose derivative, and said liquid is water.

4. A method as set forth in claim 1, wherein said material is water-soluble and resistant to decomposition by water, said binder is a cellulose derivative and said liquid is water.

5. A method as set forth in claim 1, wherein said material is water-soluble and subject to decomposition by water, said binder is a non-ionogenic cellulose derivative and said liquid is non-aqueous.

6. A method as set forth in claim 1, wherein said binder is selected from the group consisting of methylcellulose, ethylhydroxyethylcellulose, ethylcellulose, hydroxyethylcellulose, and carboxymethylcellulose.

7. A method as set forth in claim 1, wherein said binder is low viscosity methylcellulose, and said liquid is water.

8. A method as set forth in claim 1, wherein said binder is hydroxyethylcellulose, and said liquid is water.

9. A method as set forth in claim 1, wherein said binder is ethylhydroxyethylcellulose, and said liquid is acetone.

10. A method as set forth in claim 1, wherein said binder is methyl cellulose and said liquid is a mixture of methylenechloride and methanol.

11. A method as set forth in claim 10, wherein said mixture consists of 2 parts methylenechloride and 1 part methanol.

12. A method as set forth in claim 1, wherein said binder and said one material are mixed in the additional presence of another liquid in which said binder is substantially insoluble, and wherein said additional liquid is removed from the mixture after said mixing.

13. A shaped object made by the process according to claim 1.

References Cited by the Examiner

UNITED STATES PATENTS

| | | | |
|---|---|---|---|
| 2,798,838 | 7/1957 | Robinson | 167—82 |
| 2,816,062 | 12/1957 | Doerr et al. | 167—82 |
| 2,921,883 | 1/1960 | Reese et al. | 167—82 |
| 3,079,303 | 2/1963 | Raff et al. | 167—82 |
| 3,080,294 | 3/1963 | Shepard | 167—82 |
| 3,116,204 | 12/1963 | Siegel et al. | 167—82 |

JULIAN S. LEVITT, *Primary Examiner.*

FRANK CACCIAPAGALIA, JR., *Examiner.*

GEORGE A. MENTIS, *Assistant Examiner.*